(12) United States Patent
Scahill et al.

(10) Patent No.: US 9,160,706 B2
(45) Date of Patent: Oct. 13, 2015

(54) ADDRESSING SCHEME

(75) Inventors: Francis J Scahill, Ipswich (GB);
Richard J Evenden, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 182 days.

(21) Appl. No.: 13/262,080

(22) PCT Filed: Mar. 30, 2010

(86) PCT No.: PCT/GB2010/000620
§ 371 (c)(1),
(2), (4) Date: Oct. 24, 2011

(87) PCT Pub. No.: WO2010/112839
PCT Pub. Date: Oct. 7, 2010

(65) Prior Publication Data
US 2012/0036233 A1    Feb. 9, 2012

(30) Foreign Application Priority Data

Mar. 31, 2009   (GB) ................................... 0905559.1

(51) Int. Cl.
G06F 15/177   (2006.01)
H04L 29/12    (2006.01)

(52) U.S. Cl.
CPC ........ *H04L 61/2076* (2013.01); *H04L 29/1216* (2013.01); *H04L 29/12066* (2013.01);
(Continued)

(58) Field of Classification Search
CPC ................... H04L 29/12066; H04L 29/1216; H04L 29/12301; H04L 29/12896; H04L 29/12367; H04L 61/2076; H04L 61/1511; H04L 61/157; H04L 61/605; H04L 61/2514

USPC .......... 709/217, 218, 219, 220, 221, 222, 223
See application file for complete search history.

(56) References Cited

U.S. PATENT DOCUMENTS

| | | | |
|---|---|---|---|
| 2002/0083198 | A1 | 6/2002 | Kim et al. |
| 2002/0169961 | A1* | 11/2002 | Giles et al. ................... 713/175 |

(Continued)

FOREIGN PATENT DOCUMENTS

| | | |
|---|---|---|
| EP | 1724976 | 11/2006 |
| EP | 2 104 317 A1 | 9/2009 |
| WO | WO 2005/029877 | 3/2005 |

OTHER PUBLICATIONS

International Search Report for PCT/GB2010/000620 mailed Aug. 4, 2010.

(Continued)

*Primary Examiner* — Dhairya A Patel
(74) *Attorney, Agent, or Firm* — Nixon & Vanderhye P.C.

(57) ABSTRACT

An addressing scheme enables mobile web-service providing devices located within private address domains to be contacted by other devices located on the same LAN segment regardless of whether or not the two devices are located in the same private IP address domain, providing a working network path can be identified directly or indirectly between the two devices. In this way, if a device-label (such as a telephone number which is associable with an addressed device) is provided by an addressing device to an addressing server, the server is able to resolve the device-label to a private address via which the addressing device can contacted. The private address is utilized by the web-browser application to seamlessly and transparently obtain a requested web-service from the addressed device using any suitable communications channel, e.g. WiFI, Bluetooth, etc, that provides a working path between the two devices.

8 Claims, 6 Drawing Sheets

(52) U.S. Cl.
CPC .... *H04L29/12301* (2013.01); *H04L 29/12896* (2013.01); *H04L 61/157* (2013.01); *H04L 61/1511* (2013.01); *H04L 61/605* (2013.01); *H04L 29/12367* (2013.01); *H04L 61/2514* (2013.01)

(56) References Cited

U.S. PATENT DOCUMENTS

| | | |
|---|---|---|
| 2003/0227903 A1 | 12/2003 | Watson |
| 2004/0264439 A1 | 12/2004 | Doherty et al. |
| 2005/0192039 A1* | 9/2005 | Xue et al. ............... 455/517 |
| 2005/0216602 A1 | 9/2005 | Armstrong et al. |
| 2006/0221893 A1* | 10/2006 | Kiss ........................ 370/328 |
| 2007/0081544 A1 | 4/2007 | Sakai et al. |
| 2007/0101145 A1* | 5/2007 | Sachdeva et al. ........ 713/176 |
| 2007/0213039 A1 | 9/2007 | Skog |
| 2007/0214209 A1 | 9/2007 | Maeda |
| 2007/0217408 A1* | 9/2007 | Sahashi et al. .......... 370/389 |
| 2008/0028444 A1* | 1/2008 | Loesch et al. ............... 726/4 |
| 2009/0240785 A1* | 9/2009 | Kikkawa ................... 709/218 |
| 2010/0251329 A1* | 9/2010 | Wei ............................. 726/1 |
| 2012/0036233 A1* | 2/2012 | Scahill et al. ............. 709/220 |

OTHER PUBLICATIONS

Cheshire, S., and Krochmal, M., Apple Inc., "DNS-Based Service Discovery," <draft-cheshire-dnsext-dns-sd-10.txt>, Internet Engineering Task Force, Internet-Draft, Feb. 27, 2011, pp. 1-48.

Garmin Communicator Plugin API, http://developer.garmin.com/web-device/garmin-communicator-plugin/, pp. 1-3, (date unknown; downloaded 2011).

Falstrom, P., Cisco Systems, Inc. and Mealling, M., VeriSign, "The E.164 to Uniform Resource Identifiers (URI) Dynamic Delegation Discovery System (DDDS) Application (ENUM)," Network Working Group, Apr. 2004, pp. 1-17.

* cited by examiner

ADDRESSING SCHEME

This application is the U.S. national phase of International Application No. PCT/GB2010/000620 filed 30 Mar. 2010 which designated the U.S. and claims priority to GB 0905559.1 filed 31 Mar. 2009, the entire contents of each of which are hereby incorporated by reference.

BACKGROUND

1. Technical Field

The present invention relates to an addressing scheme for accessing application servers in a communications network and to related aspects. In particular but not exclusively to a scheme for addressing the host server of a third party web service running on a mobile communications device from a web browser application. In particular, but not exclusively, the addressing scheme enables mobile devices located within private address domain(s) to be contacted by other devices on the same LAN segment.

In particular, but not exclusively, the addressing scheme according to the invention seeks to enable mobile web-service providing devices located within private address domains to be contacted by other devices located on the same LAN segment regardless of whether or not the two devices are located in the same private IP address domain, providing a working network path can be identified directly or indirectly between the two devices. In this way, if a device-label (such as a telephone number which is associable with an addressed device) is provided by an addressing device to an addressing server, the server is able to resolve the device-label to a private address via which the addressing device can contacted. The private address is utilized by the web-browser application to seamlessly and transparently obtain a requested web-service from the addressed device using any suitable communications channel, e.g. WiFI, Bluetooth, etc, that provides a working path between the two devices.

The term "LAN segment" refers here to an area within which a device can use an Address Resolution Protocol request to look up and resolve the local address of other device (regardless of whether or not both devices are located in the same private address domain or in different private address domains).

2. Related Art

Network address translation (NAT) devices are known to enable reuse of the Internet Protocol (IP) address space by separating private IP address domains from public IP address domains. NAT techniques establish and maintain Transmission Control Protocol/Internet Protocol (TCP/IP) network and/or User Datagram Protocol (UDP) connections traversing NAT gateways. NAT techniques are used for client-to-client networking applications such as Voice-over-IP ("VoIP") and peer-to-peer applications (for example, file-sharing). When one or both devices (i.e., the client/service providing device) are mobile and have only intermittent connectivity however, NAT can cause problems as it disrupts the end-to-end connectivity. Several NAT control protocols exist, including Universal Plug and Play (UPnP) which typically used in a home/small office environment.

NAT enables private IP addresses to be used on home and corporate networks (internal networks) behind routers which present a single public IP address to the public Internet. When a networked device located in the private IP address domain behind the NAT gateway/router communicates with a device in the public network, the NAT device changes the source address of any outgoing requests the network device generates to the NAT device's own address.

The number of devices participating as servers whose IP addresses are allocated in the private domain behind a NAT device is increasing. The use of applications such as peer-to-peer file sharing (for example, BitTorrent™ or Gnutella™), interactive applications such as video conferencing, VoIP (for example, Session Initiation Protocol or SIP), as well as electronic gaming is also increasing. Whilst the NAT technique works well for devices which function as clients and initiate communications, as the outgoing request enables replies received by the NAT device to be forwarded back to the originating device using an appropriate method, the NAT device has no automatic method for determining from an incoming communication seeking to initiate contact with a server which device located in the private address domain is actually providing that server functionality.

The growing use of mobile devices offering services has further complicated this scenario. As has the increased use of web applications which integrate a number of services provided by multiple independent web sites within a single browser application, known in the art as "Web-based mash-ups". For example, the use of the Google™ Maps application within a unrelated application allows location and other information generated by the unrelated application to be displayed on a map generated using the Google™ Maps application.

Service integration is conventionally implemented either by integrating the third party service in the origin server, or in the web browser itself. Where the third-party service is integrated from the origin server, a variety of network protocols are available for use to support the service integration, for example, the SOAP™ based WebServices protocol. Where service integration take places in the web browser, background mechanisms which rely on dynamic <script> tag loading can be used, for example, an eXtensible MarkUp Language HyperTextTransferProtocol request (XMLHTTPRequest) or a JavaScript Object Notation (JSON) based interface.

Known service integration schemes require the address of the hosting web server to be known in advance by the web application author and hard coded into the web content. When a web-browser application running a device runs a web application with the third party content address hardcoded in a particular HyperText Markup Language (HTML) page, providing the browser security policy has been configured to authorize the web application to request content from the address of the third-party content, the requested third party web service accessed via that address will be integrated into the HTML page running in the web browser application on device.

Local networked appliances within the home are becoming more prevalent and such appliances are now capable of providing web based interfaces to allow the user to manually configure and control the appliance remotely. The local area network (LAN) device addresses for such domestic appliances are typically allocated dynamically according to the Dynamic Host Configuration Protocol (DHCP) configuration of the LAN router.

If a LAN device is a mobile device and only intermittently connected to a LAN, its IP address will not be static and can change on a frequent basis. In order to enable devices on the LAN to detect each other and determine their address a number of different schemes have been proposed such as Universal Plug And Play (UpnP), Bonjour™, etc which use multicast broadcast packets to announce the availability, address of particular devices as well as the type of services these devices offer. These protocols provide address discovery to allow client applications on a LAN to discover the address and name of a dynamically available device in order to connect to it.

In UPnP the URL of the web services provided by the device is included in the service announcements. These URLs can be displayed by the UPnP aware clients and can be passed to a web browser application as the initial address to fetch the HTML content from.

Web browser applications such as Internet Explorer™ and FireFox™ use the hierarchical Domain Name System (DNS) address lookup scheme to resolve the domain name of a hosted web service to the actual Internet Protocol (IP) address and port to connect to of the server which is hosting the web service. For example, Internet Explorer makes a DNS lookup query for Type A records (hostname) addresses. These requests are first resolved in the DNS cache of the host machine, before being passed to the local DNS server for the LAN (typically hosted in the router) before being referred by the router to the parent DNS server if unresolved. If the hostname is not defined in the DNS cache or local DNS server then the web service will be unreachable.

This imposes a constraint on the way web-services are integrated. In order for a web application to be developed which integrates Wide Area Network (WAN) and LAN web services essentially two mechanisms are available. Either when running the application provides a prompt for user input to enter the IP address of the local device which is hosting the desired third party LAN or WAN web-service or a plug-in application such as an ActiveX or Java applet which implements an address discovery protocol such as UPnP or Bonjour™ must be integrated into the web application together with a JavaScript Application Program Interface (API) to allow this information to be conveyed into the HTML execution context of the web-browser.

A user may not be able to identify the host name or UPnP name of the device hosting the desired third-party service. A default address for a third-party service may have no association with a device which is apparent to a user. The name may bear no relation to a user's concept of a device name and may also assume that the user has actually configured a unique name for the device and not relied on some default naming convention adopted by the device manufacturer.

An exception is when the LAN device hosting the third-party service is a telephone-type device, as the unique device ID is the phone number associated with the phone device, which a user may be aware of and if not, can usually determine.

Accordingly, if a user is prompted for a telephone number for a device to enable that device to provide a web-service to the user's device, it is likely that the correct telephone number may be provided. This means a web content author can realistically develop a web application which includes a prompt for a user to enter a phone number for a device which is to provide a required third-party web service in order to integrate that web service at the runtime of the web application, providing the phone number entered by the user is capable of being converted into a IP address on the local LAN of the device which is hosting the third-party web-service.

It is well known that certain predefined names can map to specific devices. For example, "localhost" is a well known name that matches to the 127.0.0.1 IP loopback address of the current device. This is utilized by plugin's such as the http://developer.garmin.com/web-device/garmin-communicator-plugin/ which provides a Javascript API to a web browser plugin that allows a web application to talk to a Global Positioning Service (GPS) device connected on a Universal Serial Bus (USB) port to the device hosting the web browser application. The Apple™ proprietary Bonjour™ and the UPnP standard both use multicast DNS to broadcast the IP address of a named device to other computers on the same LAN as the named device. However, both of these systems require that an application which needs to perform device name to IP address conversion is either Bonjour™ or UPnP aware.

The DNS service discovery (DNS-SD—see, for example, http://files.dns-sd.org/draft-cheshire-dnsext-dns-sd.txt for more details), provides a mechanism to find services on a local LAN using DNS. This system uses service (SRV) type records (see Request For Comment (RFC) 2782 available from the Internet Engineering Task Force (IETF) standards body for more information about locating services using DNS and SRV records) in the local DNS database to provide a service to IP address and port lookup mechanism.

In order to use DNS-SD, an application incorporating a third party web-service must be aware that the address it has obtained for the third party server hosting that third party web-service is not correct in order to trigger a request to perform a SRV lookup. As web browser applications are conventionally configured to automatically assume when accessing a web-service that a given web-service address host name is the correct for that web-service, the application will automatically use the given hostname to perform a lookup on the hostname field in the DNS database, regardless of whether that hostname is accessible or not or whether it is the correct hostname or not for the requested service. As a result, existing web browsers do not trigger the DNS-SD SRV lookup procedure.

RFC3761 describes a standard mechanism for converting a telephone number into a domain name. Essentially the number is reversed, the digits separated by "." and postfixed with the .e164.arpa domain. This RFC ensures that unique phone numbers can be converted to unique domain names but then relies on standard DNS to resolve the *.e164.arpa domain to an IP address.

Dynamic DNS (DDNS) provides a mechanism for devices to dynamically update the IP address to domain name mapping via a internet resident server. This server ensures that only authorized clients are allowed to change the IP address for a domain. DDNS is typically used for supporting remote access to home networks where the public IP address of the home router is dynamically allocated by the ISP.

The DDNS client is responsible for automatically detecting the IP address change and update the DDNS server. However, the new IP address must then propagate across the internet to other domain name servers in the internet and as such only becomes reliably available after a period of time has passed. The amount of time varies as it depends on the rate at which DNS updates are disseminated across the domain name servers in the internet.

The delay between the update occurring and it being made available is set by the TimeToLive (TTL) value set by the DDNS name server. This would typically be 1 hour, however since name lookups are not made to the DDNS server but typically to an Internet Service Provider's ISPs DNS server, the time for a new IP address change to percolate depends on both the TTL and whether other DNS servers respect the TTL.

DDNS services also allow client to register private IP addresses, however such private IP addresses are only valid if the device requesting the lookup and the server are on the same LAN segment.

United States Patent Application US20070214209 describes a DDNS style service in which an addressing database holds additional information relating to a device address. However, US20070214209 does not consider the criteria for providing an IP address for a device located on the same LAN segment as the address querying device. US 20070214209 considers the geographical proximity between the querying device and the device whose address is being queried, however, geographical proximity between two devices does not imply they are on the same LAN segment. For example, two devices may be connected on a 3G wireless communications network and be physically adjacent to each other in the same location despite one device not being connected to a LAN which the other device is connected to. Even if both devices are connected to the same physical wireless network, for example, if both devices are connected to a WiFi LAN via the same WiFi Access Point, one device may not be capable of addressing another if the WiFi access point implements wireless client separation. WiFi hotspot routers will enforce wireless client separation by not indicating a route can be established between two devices so that even where two devices are on the same WLAN their presence is not automatically indicated to each other.

BRIEF SUMMARY

The preferred aspects of the invention are as set out below and by the accompanying independent claims and the preferred embodiments are as set out below and by the accompanying dependent claims. The preferred aspects and embodiments may be combined with each other in any suitable manner apparent to one of ordinary skill in the art.

One aspect of the invention seeks to provide a method of determining a dynamic address via which a web-browser running on a web-service requesting device connected to a local area network is able to interface directly with a web-service providing device intermittently connected to said local area network, the method comprising: the web-service providing device reporting presence information to a domain addressing server 22 using said local area network communications link; the domain addressing server processing the reported presence information to store in a first data store, local area network device signature information in a data structure associated with an identifier for the web-service providing device, the signature information identifying at least one other device in association with at least one IP address for the communications protocol via which said web-service providing device has received data from said at least one another device; storing in a second data store, in a data structure associated with said web-service requesting device, a local area network signature for said service requesting device on the local area network which is associated with a cookie provided by a web-browser application running on said service requesting device, and when said web-browser running on said web-service requesting device requires said web-service to be provided by said web-service providing device, generating an address query for said web-service providing device which identifies the web-service providing device by a telephone-number; sending the address query to said domain addressing server; processing the address query to extract cookie information and said telephone number; performing a look-up operation on said second data store using the extracted cookie to determine the local area signature of the web-service requesting device, and performing a look-up operation on said first data store using said telephone number of to determine if the associated data structure includes the signature of the service-requesting device, and if so, retrieving the stored address and communications protocol for said LAN signature; forwarding the retrieved information to the web-service requesting device for use by said web-browser to directly address said web-service providing device using said retrieved address and communications protocol.

In the above method aspect, the retrieved address may be a private internet protocol address.

The service-requesting device is a device initiating a communication, also referred to as an addressing device in some embodiments of the invention described herein below. The service providing device is the addressed device which responds.

Another aspect of the invention seeks to provide a system for providing dynamic address information to devices requesting a web-service which is intermittently available on a local area network from another device, the system being arranged to determine a dynamic address via which a web-browser running on a web-service requesting device connected to a local area network is able to interface directly with a web-service providing device intermittently connected to said local area network, the system comprising: a first data store; a second data store; a domain addressing server 22 comprising: communication receiving means to receive reported presence information from the web-service providing device via a communications link on said local area network; processing means to process the reported presence information to store in said first data store, local area network device signature information in a data structure associated with an identifier for the web-service providing device, the signature information identifying at least one another device in association with at least one IP address for the communications protocol via which said web-service providing device has received data from said at least one another device; processing means to store in said second data store, in a data structure associated with said web-service requesting device, an local area network signature for said service requesting device on the local area network which is associated with a cookie provided by a web-browser application running on said service requesting device, means to generate an address query for said web-service providing device which identifies the web-service providing device by a telephone-number when said web-browser running on said web-service requesting device requires said web-service to be provided by said web-service providing device, means to send the address query to said domain addressing server; means responsive to receiving the address query on said domain addressing server to process the address query to extract cookie information and said telephone number; processing means arranged to perform a first look-up operation on said second data store using the extracted cookie to determine the local area signature of the web-service requesting device and arranged to perform a look-up operation on said first data store using said telephone number to determine if the associated data structure includes the signature of the service-requesting device determined in said first look-up operation, and means to retrieve the stored address and communications protocol for said signature and to forward this to said web-service requesting device to enables said web-service requesting device to directly address said web-service providing device using said retrieved address and communications protocol.

The retrieved address may a private internet protocol address. The service requesting and service providing devices may be located in the same private internet protocol addressing domain, or in different private address domains, located on the same LAN segment.

Another aspect of the invention seeks to provide to a device arranged for use in a system aspect.

Another aspect of the invention seeks to provide a domain addressing server arranged for use in a system aspect.

The aspects and embodiments of the invention require a user to know the telephone number of the device they want to connect to in order to access a web-service which requires the participation of that device. Advantageously, however, the user is not required to provide any additional information such as the UPnP name and/or the DHCP name of the other participating device.

The aspects and embodiments of the invention enable a user to be capable of connecting a device they are operating to any device on the same LAN segment as the user's device for which the phone number is known to the user. This advantageously removes the need to know the UPnP device name or hostname of a phone device which a user does not necessarily own.

The aspects and embodiments of the invention do not require device addresses for third party services to be hard-coded into applications as the user can be prompted for the telephone number of the relevant host device for that third party service which the invention resolves to an appropriate IP address. It is also possible for phone numbers to be stored in appropriate database structures on the content server.

As phone number to IP address resolution is handled by using standard Asynchronous JavaScript and XML (AJAX) web service calls, which allow a web application to be incremental updates to a user interface without reloading the entire browser page, address resolution does not require any browser specific code such as, for example, Browser Helper Objects (BHOs), plugins, or ActiveX components, in order for the web content to be able to connect to the LAN device. Thus, unlike UpnP, Bonjour™ and the DNS look-up mechanisms the phone number associated with the device is not broadcast over a LAN or WAN network. This enables a telephone number to be kept private.

Accordingly, unlike DDNS services, the aspects and embodiments of the invention seek to provide a way to guarantee that an IP address for a third party web service is valid which enables a device to determine if another device's private IP address is on the same LAN segment.

One embodiment of the invention provides simultaneous support for multiple private networking connections.

The embodiments of the invention thus seek to mitigate and/or obviate one or more limitations imposed by DDNS. For example, traditional DNS updates take an unpredictable time to disseminate across communications networks to DNS servers and local machine caches. For IP addresses that are updated more frequently than 1 hour then the probability that a DNS update will return an out-of-date error is high. When the device is a mobile device then there is a high probability of in particular the private IP address changing frequently.

An addressing scheme according to an embodiment of the invention enables a wired and/or wireless communications-enabled device to utilise a plurality of connections, for example, to utilise both LAN and WAN connections, to update its address on an address database. Thus, providing a web application which is seeking to obtain content from the wireless communications device queries the authoritative name server on a sufficiently frequent basis, the IP address which will be retrieved from the database in response to such queries should be the correct address.

This enables the IP address for web-services to be made available to devices on a local area network reliably even when the device hosting the web-service is only intermittently connected to that local area network.

The invention also seeks to address another limitation of the DDNS standard technology in that conventionally if the public IP address of a wireless communications enabled mobile device is exposed for use by geo-location servers in order to determine the location of the mobile phone this may expose information (for example, location information) which the user of the mobile device may wish to remain secret. As the public IP address information is needed to ensure that the mobile is on the same LAN segment as the fixed device, this may be undesirable. To address this, a web server according to an embodiment of the invention enables a private IP address to be exposed whilst the public IP address remains hidden.

Another limitation of the DDNS standard occurs when a fixed device is connecting to another LAN device using a private IP address as there is a high probability that the private IP address may have been reassigned. In this situation, an out-of-date DNS response would resolve to another valid device on the LAN but not the original intended device for connection to.

Embodiments of the invention also seek to obviate and/or mitigate problems associated with using a DDNS update to the local LAN DNS gateway. As the DNS gateway retains a record of the presence of the telephone number of the mobile communications device, other devices on the same LAN would be able to discover the telephone numbers and additional information, such as a device identifier, for one or more other devices also connected on the same LAN segment.

This again may cause privacy concerns.

Embodiments of the invention also seek to obviate and/or mitigate one or more problems which arise when a plurality of devices share a router but are still not able to contact each other, for example, when a wireless client separation regime is operating and/or if multiple layers of NAT must be traversed, by ensuring that the private IP address associated with the telephone number of a device on a private network is only provided to other devices that the device has determined are on that private network.

Some embodiments of the invention do not require additional software to be implemented in any fixed device or LAN router and some embodiments are usable with any Javascript enabled web browser on any operating system without modification or the need for any browser specific code.

BRIEF DESCRIPTION OF THE DRAWINGS

The preferred embodiments of the invention will now be described with reference to the accompanying drawings which are by way of example only and in which.

DETAILED DESCRIPTION

In the following description of the preferred embodiments of the invention, those of ordinary skill in the art will be aware of modifications and functional equivalents to those features of the invention which are described herein below and that certain features of the invention may be omitted from the description for the sake of brevity and clarity where their inclusion and function as part of the invention is apparent and known to those of ordinary skill in the art.

Figure 1:
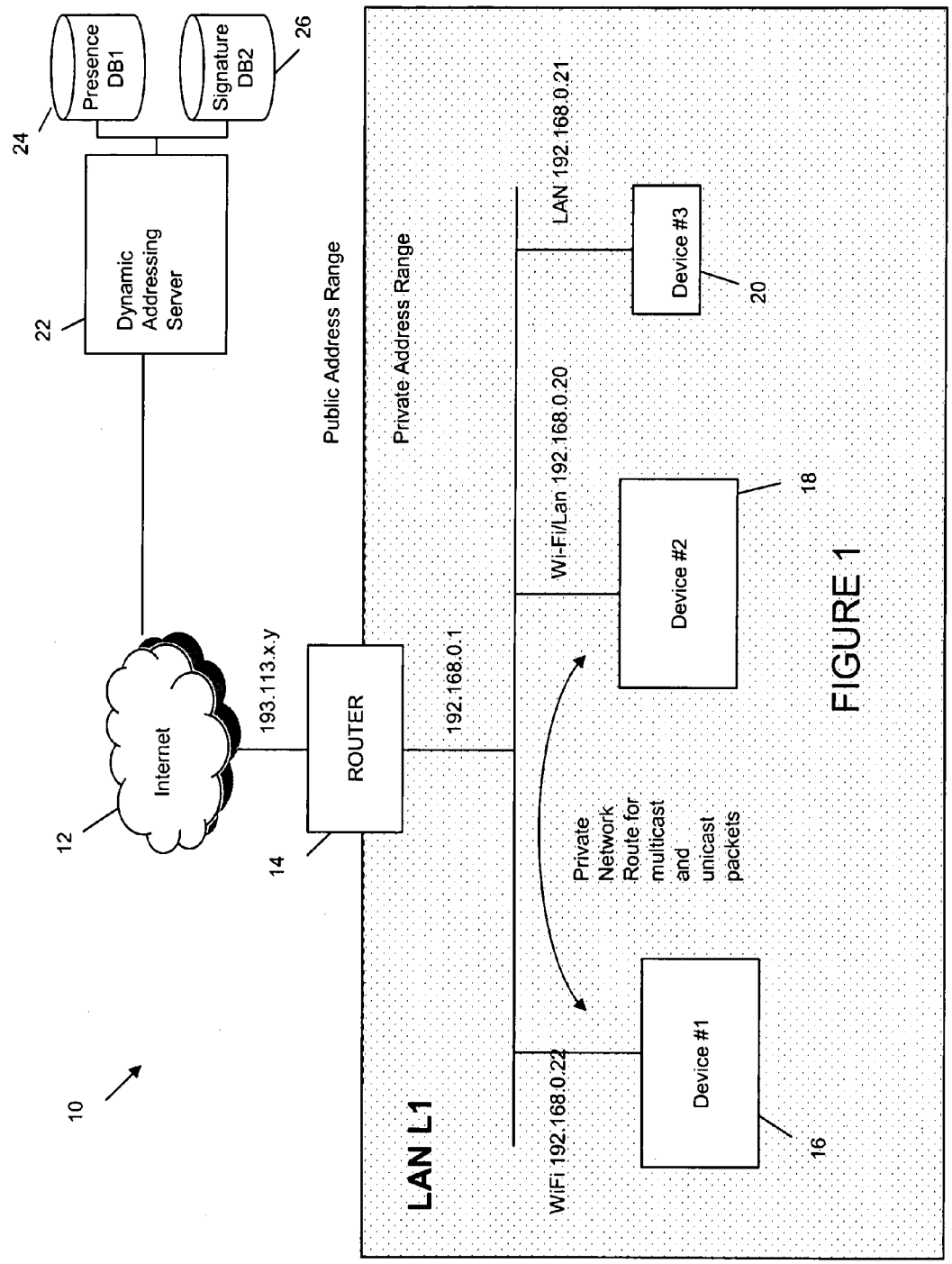
FIG. 1 shows schematically a communications system comprising an addressing scheme according to a first embodiment of the invention.

FIG. 1 shows schematically a mobile communications device shown as addressing device #1 which is intermittently connected to a LAN L1. LAN L1 forms part of the access network in a communications system 10 which also comprises an internet 12 and a dynamic addressing server (DAS) 22. DAS 22 is an internet resident server which stores the real-time private IP address of all devices which are intermittently connected to LAN L1. DAS 22 provides a dynamic DNS-like host-name to address look-up mechanism to allow web-based content running in a browser application to be able to securely and reliably determine the IP address of a mobile server device, such as a mobile phone, which is running on the same LAN segment, merely by providing an appropriate device-label (such as a hostname), for example, for a mobile device, the device-label may consists of a mobile phone number.

The term "addressing device" is also used herein equivalently to a "service addressing device", a "web-service requesting device" or "service requesting device" and the term "addressed device" is used synonymously with the term "server", "service-providing device", a "service offering device" etc. In this context, the term device refers to any communications-enabled device, for example, a client terminal capable of attaching to a LAN segment, including mobile devices etc., for example, a mobile telecommunications device, household appliance, television signal receiver-type device, electronic games console, etc., etc. The term "addressing server" is also be used herein to refer to DAS 22, as may the terms "domain addressing server", "dynamic domain addressing server" and "dynamic addressing server".

As mentioned previously, the term "LAN segment" as used herein to an area within which a device can use an Address Resolution Protocol request to look up and resolve the local address of other device (regardless of whether or not both devices are located in the same private address domain or in different private address domains). The two devices therefore be attached to a local area network segment bounded by one-hop routers.

As shown in FIG. 1 three devices 16, 18, 20 are connected to LAN segment L1 (which may comprise one or more wired and/or wireless LANs). However, the devices may be only intermittently connected to the same LAN segment. As shown in FIG. 1, device #1 has the private IP address 192.168.0.22, and device #2 18 and device #3 20 have the respective private IP addresses 192.168.0.20 and 192.168.0.21. As shown in FIG. 1, device #2 has a wireless connection, e.g. a Wi-Fi connection, to the public internet 12. For example, in one embodiment, device #2 comprise a personal computer which is disconnected from LAN L1 when it is switched off or otherwise disconnected and device #3 20 comprises another type of intermittently available device such as a set-top box for example. In general, however, devices 16, 18, 20 can each comprise any device capable for forming an appropriate communications link to LAN L1, and may be referred to herein by the term "terminal", "device" and "server" as appropriate. For example, a device capable of being connected to a communications network using a wired and/or wireless connection, for example, by using a permanent connection (for example an Asymmetric Digital Subscriber Line (ADSL)—type connection known as a broadband connection) or via a dial-up communications connection and/or WiFi. Accordingly, examples of possible devices device 16, 18, 20 include any suitably communications-enabled domestic appliances, set-top television boxes, games console, computers (both desk and laptop) which are identifiable via a telephone number as well as telephone-type devices such as mobile telephones etc.

As shown in FIG. 1, router 14 supports the connection of devices to local area network (LAN), and provides an access point to the DAS 22 for the devices 16, 18, 20 connected to the LAN. Router 14 thus acts as a boundary device for the LAN segment L1 by separating the public and private IP address domains. Router 14 is shown with an exemplary address 192.168.0.1 in the private domain and 193.113.x.y in the public domain.

In FIG. 1, client terminals #1 and #2 are capable of running web-browser applications. Such web-browser applications are capable of generating address queries to locate the IP address of a remote host to receive data from that host, for example, data which the host provides as a web-service or data which comprises content required by the respective web-browser application. An address query generated by a web-browser running on a device (16, 18) connected to LAN L1 is forwarded to the DAS 22 via the router 14 over internet 12. The response from the DAS 22 provides an private IP address which enables the web-browser applications running on the respective device 16,18 to communicate with the device 20 providing the requested web-service if this device 20 is connected at that point to the same LAN segment as the service-requesting device 16,18.

As shown in FIG. 1, router 14 comprises a wireless communications network protocol router, for example a WiFi enabled router and at least one of devices 16, 18, 20 comprises a wireless communications-enabled device.

The addressing device 16 shown in FIG. 1 is connected to a local area network (LAN) segment L1 via the wireless router 14 and runs a web-browser which at some point needs to query and retrieve a private IP address for another, addressed, communications-enabled service providing device 20 which is also connected to the same LAN segment L1.

In the embodiment of the invention shown in FIG. 1, an addressing system comprising DAS 22 and two associated data stores 24, 26 providing registry services enable a web-service requesting device 18 connected to LAN L1 to locate an addressable IP address for a web-service offering device 20 (functioning here as a service providing device). Data store 24 stores the presence information of all devices connected to LAN L1. Each time a device 16,18,20 connects to LAN L1 it notifies DAS of the private IP address used to address its interface to LAN L1, and the DAS updates data store 24. Data store 26 stores device signature information which associates the private IP address for a particular device present on the LAN (i.e. whose signature is stored in data store 24) with a cookie associated with a particular web-service. In this way, a web-service requesting device is able to locate the current and correct private IP address for a particular interface on a web-service offering device 20.

Returning to FIG. 1 of the accompanying drawings, DAS 22 enables a dynamic domain name server (DDNS)-like hostname address for the service providing device 20 to be retrieved from the presence address database DB1 24. The DDNS-like hostname address is provided in response to the service requesting device 16,18 generating an address query which identifies the service providing device 20 device using a device-label, for example, a device hostname or telephone number, or any, even a personalized, device name which has been registered at the DAS as one which is to resolve to a particular device so that it is capable of functioning as a address identifier to perform an IP address look-up operation for the device with which the label is associated. For example, by using an identifier for the service providing device which conforms with the telephone numbering system E.164.

However, instead of performing a static domain name server-type look up using a telephone number mapping scheme such as the E.164 NUmber Mapping (ENUM) scheme which to map a telephone number to a static internet address using a domain name server, the DDNS-like hostname address is retrieved is the current address of the service providing client terminal. Thus DAS 22 enables a web-browser application running on the addressing client terminal 16 to determine the current local private IP address for the addressed client terminal 20. This enables a web-browser application running on client terminal 16 to retrieve content and/or access a requested web-service from the addressed client terminal 20 which is only intermittently connected to LAN L1 in a more reliable way as the returned address will be more likely to be up to date and accurate for the addressed client terminal 20.

The address database DB#1 24 comprises a plurality of data records, each record having a data structure which enables a look-up operation or other data retrieval operation to be performed using a telephone number field.

Accordingly, as shown in FIG. 1, addressing device 16 generates queries for the IP address of the service-offering terminal 20 which identifies terminal 20 only by its telephone number. When DAS 22 receives the address query it processes it to extract the telephone number and performs a look-up (or equivalent data retrieval) operation based on the telephone number as a searchable index element in data store 24. When a data structure is located in data store 24 which associates an IP address with the telephone number of the query, the IP address is returned to DAS 22 which then forwards the IP address back to the address-requesting device 16.

The addressed device 20 is identifiable either by means of a fixed PSTN type telephone number or it may, alternatively, be identifiable by another mobile telephone number in a preferred embodiment of the invention. In either case, as the addressed device 20 is only intermittently connected to the LAN L1 its private IP address is not consistent as the addressed device 20 is capable of being assigned a different private IP address each time it connects to the LAN L1.

In one embodiment of the invention, DAS 22 stores the real-time private IP address allocated to a mobile phone device 20 connected to LAN L1. This private IP address information is updated by a DAS 22 client application running on the device 20 whenever it connects or disconnects from a network. Other web-enabled applications running on other devices such as PCs or other internet communications-enabled devices connected to LAN L1 query the DAS 22 by supplying the mobile phone number for the device 20. The DAS 22 is able to retrieve the current private IP address of the addressed device 20 only if both the requesting device 16 and the addressed device 20 are connected to the same LAN segment and if there is a working network path between the requesting device 16 and the addressed device 20 which may be provided by a different communications protocol from the communications protocol of LAN L1. If there is no working network path which exists between the two terminals, no IP address will be returned to the requesting device.

In this way, the embodiments of the invention ensure that an address requesting device 16 is only provided with the IP address of another device 20 if a working network path exists between the two terminals by verifying that the addressed device 20 and the requesting device 16 are actually on the same LAN segment and that there is a working route between the two terminals which utilizes the same LAN prior to responding to the addressing query.

An exemplary device presence data structure stored in data store 24, for example, a record stored in a database DB1, is shown in Table 1 below:

TABLE 1

Exemplary data record for database DB1.

| Device ID | Active Networks | Observed LAN Signature |
|---|---|---|
| 077771234567 | Addr: 192.168.0.1<br>Type: Wifi<br>SSID: Home | Dev1 {<br>UPNP:<udn><br>NBNS:<computername><br>MAC:<macaddress><br>}<br>Device 3: |
| | Addr: 169.254.2.1<br>Type: USB | Dev2 {<br>UPNP:<udn><br>} |

As Table 1 shows above, a presence data structure for storage in data store 24 comprises three main elements shown in columns in table 1:

i) a device identifying field shown in Table 1 as a "Device ID" field which houses the telephone number on which a look-up or other data retrieval operation may be performed, and which is shown in Table 1 as containing for this data record a telephone number such as a mobile telephone number. This field functions as a index entry for locating the data associated with a particular device in the data store 24.

ii) an active network(s) field labelled in Table 1 as an "Active Networks" field. The active network field is expandable through the use of sub-fields, and is shown in Table 1 as comprising two sub-fields. In Table 1 the two sub-fields indicate the device identified by its 07777 1234567 telephone number currently has two networks active: a WiFi network, on which the device has the address 192.168.0.1 and a network connection via a USB port which has the address 169.254.2.1.

iii) an LAN presence of active network connection field labelled in Table 1 as "Observed LAN signature" field. The LAN presence field is expandable through the use of sub-fields which correspond to the LAN presence of other devices and each of the active network connections with those devices associated with the addressed device 20. For the particular device record shown in Table 1, both the WiFi and the USB connection establish the device on the LAN and the associated LAN presence information is shown.

The first sub-field for LAN presence shows the various named presences of the addressed device on the WiFi network connection, shown for example in Table 1 as Dev1 {UPNP: <udn>, NBNS:<computername>, MAC:<macaddress>}. Here Dev1 is a token device identifier for the address requesting device which is followed by the various named presences of the address requesting device on the LAN. For example, the device 16 presences on the WiFi connection are collectively listed in the data record subfield for "Dev1". Dev1 has a UPNP presence on the LAN using the address value <udn> observed by the addressed (service providing) device. Dev1 also has a NetBIOS Naming Service (NBNS) presence on the LAN using the address value <computernam>. These LAN signatures relate to the addressing (service requesting) devices and are not the signature of the addressed (i.e., the service providing) device 20. Device Dev1, Dev3 and device 3 are all other devices on the LAN which have been observed by the addressed device 20. The signatures accordingly are not the signatures of device 20 rather they include the signatures of the service requesting devices 16 and 18. The NBNS is a central repository which records all name registrations for a device which is well known in the art. When an application wants to register a name, it contacts the name server (which has a known network address) and asks whether a name is already registered, using a "Name Query" packet. The name server returns a negative response immediately if the name is not already in the database, meaning it is available. The Name Service, according to RFCs 1001 and 1002, is called NetBIOS Naming Service or NBNS. NBNS is a NetBIOS Naming Service. Dev1 also has an addressable Media Access Control address <macaddress>.

The second sub-field entry for LAN presence shows the named presence of a second device, for example, the addressed device 20 shown in FIG. 1 is contactable by Dev2 using its USB port which is shown for example in Table 1 as Dev2 {UPNP:<udn#1>}. Here Dev2 is a token device identifier for the addressing device 18 on the USB connection to the LAN. Device 20 can be addressed on the LAN via the USB connection IP address value 169.254.2.1

Referring back to the exemplary embodiment shown in FIG. 1, DAS 22 is configured to maintain and perform data lookup and retrieval operations on presence data store 24 and will store in data store 24 information when the addressing device 16 reports its presence to DAS 22 to indicate it has received packets from two other devices, indicated in Table 1 for example, as Dev1 which refers to the other device 18 and Dev2 which refers to the other device 20. Device #2 will have a similar data structure recording its presence on the LAN L1.

Thus data store 24 records for each device whose presence has been observed by device 20 on LAN L1 to DAS 22 a look-up device identifier value (a telephone number), an address for the addressed device on each network the addressed device is actively connected to, and a name/address which signifies the presence of the device on the part of the LAN that can be observed by the addressing device 16. Thus an exemplary data record in presence data store 24 comprises, for example: a mobile phone number which identifies a device to be addresses; a set of one or more private IP addresses on which the device with that mobile telephone number can be contacted; and the corresponding observed device signature values derived from the actual broadcast IP traffic observed on each private network interface corresponding to one of the set of one or more private IP addresses.

As mentioned, the presence data store 24 is updated by DAS 22 each time a dynamic addressing client (DAC) 20 connects to a new network. Data store 24 may also be updated if the DAC 20 detects a broadcast packet indicating a device has been removed, for example, if DAC 20 determines a Universal plug aNd Play (UpnP) Bye message or a broadcast packet from the device 16 has not been seen within a particular period of time, for example, if a UpnP notify or NetBiosNamingServer (NBNS) host announcement is not seen at an expected time.

DAS 22 also maintains the data records hosted in a second data store, LAN signature data store 26, shown in FIG. 1 as signature database DB2 26. LAN signature data store 26 contains data records which maps a persistent HTTP cookie value to a corresponding LAN signature which is associated with a service-requesting device 16 hosting a web-browser. A LAN signature in data store 26 is determined and set once by the dynamic addressing server 22 during a one-off device pairing step that is performed the first time the two devices 16, 20 initiate communication with each other. The LAN signature data structures in data store 26 associate a set of one or more device signatures with corresponding hypertext transfer protocol (HTTP) cookies known as web cookies, or as defined below in an exemplary embodiment of the invention:

Web cookie: Device Signature:
Abcd 12345 NBNS:<computername>

Although an http cookie can comprise arbitrary data which is generated by a web-server and sent to a web-browser which returns the cookie unchanged to the web-server to introduce a state into an otherwise stateless HTTP transaction, here the cookie may be determined by a script supported and enabled by a web-browser.

When a web-browser running on a service-requesting device 16 generates an address query which is sent it to DAS 22, DAS 22 extracts the cookie from the http header of the request which is associated with the querying device 16. This cookie is used to perform a look-up operation in data store 26 for the LAN signature of the service-requesting device 16.

If a LAN signature is found for the service-requesting device 16, then the LAN signature for the service requesting device, say NBNS<computername> is searched for in the observed LAN signature fields of presence data store 24. If a corresponding entry is found in data store 24, the active network address for the called device via which the service requesting device can obtain the requested web-service can be retrieved by DAS 22 and returned to the web-service requesting device 16. In this way, a private IP address can be returned to the requesting device 16 by DAS 22 which can be used by the requesting device 16 to connected directly to the service-offering device 20 over the LAN. If a LAN signature is located in data store 22 but no corresponding observable LAN entry is found, it means that a private network route is not available and the DAS 22 reports to the requesting device 16 that no private address can be located for the requested web-service providing device 20.

If data store 26 (DB2) does not return a LAN signature to the DAS 22, DAS 22 has no returned LAN signature for the requesting device 16 to compare with any of the current observed signatures for the requested device 20 in the presence address data base 24 (DB1). In this case, an "initial pairing" process commences as described in more detail hereinbelow which associates a cookie value for the web-browser application running on the web-service requesting device with a LAN signature.

A "LAN signature" is derived from the broadcast IP packets observed by the devices on the LAN. There are a variety of broadcast IP protocols that are commonly used on private LANs these include but are not limited to the Dynamic Host Control Protocol (DHCP), the NetBIOS Name Service (NBNS) protocol, the Multicast Dynamic Name Server (MDNS) protocol, the Simple Service Discovery Protocol (SSDP), and the Internet Group Management Protocol (IGMP).

Each broadcast packet provides information about a particular device on a network. Each broadcast protocol includes specific fields whose values are device specific and time independent. For example in the case of NBNS this includes the computer name of a MS Windows based PC, in SSDP it may include information about the device unique ID, friendly name, device type of a Universal Plug and Play (UPNP) device. In all cases it provides information about the set of MAC addresses of devices that are broadcasting packets to the LAN. The LANB signature of a device is therefore a set of exemplary IP packets for each multicast protocol. Each exemplary packet comprises a captured packet with the time varying fields discarded.

In one embodiment of the invention, an exemplary broadcast NetBIOS Name Service protocol packet comprises a plurality of time independent fields which are used to populate the LAN signature for a device. For example, the MAC address, Host Name and host description fields may be concatenated to augment the uniqueness of the Host Name field. The pseudocode structure of an exemplary NetBIOS packet is shown below:

Frame 4 (262 bytes on wire, 262 bytes captured)
    Ethernet II,
    Src: 80:00:60:0f:e8:00 (80:00:60:0f:e8:00),
    Dst: Broadcast (ff:ff:ff:ff:ff:ff)
    Internet Protocol,
    Src: 169.254.2.2 (169.254.2.2),
    Dst: 169.254.2.255 (169.254.2.255)
    User Datagram Protocol,
    Src Port: netbios-dgm (138),
    Dst Port: netbios-dgm (138)
    NetBIOS Datagram Service
    SMB (Server Message Block Protocol)
    SMB MailSlot Protocol
    Microsoft Windows Browser Protocol
    Command: Local Master Announcement (0x0f)
    Update Count: 0
    Update Periodicity: 12 minutes
    Host Name: BTG129230
    OS Major Version: 5
    OS Minor Version: 1
    Server Type: 0x00051007
    Browser Protocol Major Version: 15
    Browser Protocol Minor Version: 1
    Signature: 0xaa55
    Host Comment: BT Business Machine The pseudocode for an exemplary SSDP broadcast packet as shown below includes the a MAC address field and also a USN field which contains a U1PnP unique device identifier.

Frame 118 (311 bytes on wire, 311 bytes captured)
    Ethernet II,
    Src: SamsungE_00:ff:fc (00:15:99:00:ff:fc),
    Dst: IPv4mcast_7f:ff:fa (01:00:5e:7f:ff:fa)
    Internet Protocol,
    Src: 132.146.168.234 (132.146.168.234),
    Dst: 239.255.255.250 (239.255.255.250)
    User Datagram Protocol,
    Src Port: 1024 (1024),
    Dst Port: ssdp (1900)
    Hypertext Transfer Protocol
    NOTIFY * HTTP/1.1\r\n
    HOST: 239.255.255.250:1900\r\n
    CACHE-CONTROL: max-age=60\r\n
    LOCATION: http://132.146.168.234:5200/Printer.xml\r\n
    NT: upnp:rootdevice\r\n
    NTS: ssdp:alive\r\n
    SERVER: pSOS/2.23 UPnP/1.0 SAMPLE/1.0\r\n
    USN:uuid:SamsungPrinter1_03837BAAL300698K.::upnp:rootdevice\r\n\r\n Thus, in this exemplary embodiment, two signatures exist in DB2 for the two devices 16,18 in which the two device signatures are time independent and independent of the LAN segment that the devices are connected to. For example:

Device 1: A desktop PC connected on a USB cable to the phone device

```
{
Ethernet
Src: 80:00:60:0f:e8:00 (80:00:60:0f:e8:00),
Microsoft Windows Browser Protocol
Host Name: BTG129230
OS Major Version: 5
OS Minor Version: 1
Server Type: 0x00051007
Browser Protocol Major Version: 15
Browser Protocol Minor Version: 1
Signature: 0xaa55
Host Comment: BT Business Machine
}
```

Device 2: A Printer visible via the Wifi interface

```
{
Ethernet II,
Src: SamsungE_00:ff:fc (00:15:99:00:ff:fc),
SSDP
USN:uuid:SamsungPrinter1_03837BAAL300698K.::upnp:rootdevice\r\n
}
```

Thus a LAN signature for a device comprises a set of one or more device signatures for that device which are observable by means of the packets broadcast in one or more protocols to other devices connected using the same protocol to the same LAN. Accordingly, not all the devices signatures will have entries for all broadcast protocols. Where the phone device is connected to multiple LANs then there will be multiple LAN signatures.

If the requesting device has not itself issued any broadcast packets, then there may not be any entries in the device signature or observed LAN signature that are directly attributable to the requesting device. In this case, it is possible that the stored device signature is based on broadcast packets issued by a device that is known to have a fixed relation to another device. For example, in a home environment a Wi-Fi enabled photo frame may not generate any broadcast packets however it's relationship to that home network is fixed and is deduced due to the photo frame being capable of observing broadcast packets from other fixed devices on the same LAN, e.g. a printer or desktop PC that do issue broadcast packets.

Signature Comparison Function

One embodiment of the invention provides a signature comparison which involves determining whether any of the device signatures observed in a LAN signature match that of the stored device signature associated with a cookie supplied by the requesting device. Once the device signature has been located (based on the cookie value) then the stored device signature broadcast packet field values are compared with the corresponding fields in the observed device signature packet values If a match is found for any of the protocol types then the stored device is determined to be observable by the mobile phone and hence a private network route exists.

For example using the observed LAN signature above and the stored signature StoredDevice1 {NBNS: Computer1}

In this case, a match is found between Observed device 1 and Stored Device1 based on the computer name field within the NBNS reference and observed packets. For the comparison purposes it is important that the broadcast protocol packet fields are known to be reliably unique, for example, a UpnP UUIDs or Ethernet MAC address are each good candidates for uniquely identifying packet fields.

Observed LAN Signature Update Process

On connection to a new LAN, a mobile device, for example a smart phone, starts receiving and storing broadcast packets from other devices which are also connected to the LAN. As each broadcast packet is received the device determines if the packet conforms to a protocol which a previously received packet conformed to and whether it was received from the same source IP address and/or MAC address as the previously received packet. If the device locates a previously received a packet conforming to the same communications protocol from the same source, the device discards the new packet. If not, however, the device stores the newly received packet and sends this to DAS 22 in association with the private IP address that the new packet was observed on which enables multiple network interfaces to be differentiated.

The DAS 22 processes the received packet information to derive (and where appropriate update) the device signature. In this way, by extracting and storing the values of the communications protocol specific unique fields it is possible to update presence data store 24.

On disconnection from a LAN the device informs the DAS 22 that the observed signature associated with its previous private IP address of the disconnected network should be removed from database 26 and/or made available for other devices to use. Where a device supports multiple network interfaces the device then disconnects just one of its interface. In this way, for example, when a device disconnects from a WIFI connection, it is possible to notify this event (the WIFI disconnection) over another interface, for example, a 3G wireless cellular communications network connection. Alternatively, if no network connections are available then the device marks all LAN signatures as empty by calling a telephony server which then uses an identifier for the mobile phone to empty all the observed signatures for that mobile number (e.g. the calling line identifier is used if the International Mobile Subscriber Identity (IMSI) or International Mobile station Equipment Identity (IMEI) identifier for the mobile telephone is not sufficient for this purpose).

Stored Device Signature Creation/UpdateProcess

As mentioned previously herein above, in order to match a device's presence on a LAN with its signature on the LAN, a device signature must be previously stored in association with the requesting device.

As described earlier herein above, a device signature is associated with a cookie stored by the requesting device's browser. However, initially no cookie exists and an association must first be set up to populate the signature data store DB2 26. The population of data store 26 may be performed in a number of ways.

Four exemplary embodiments of a method of populating a signature data store with device signatures in association with a cookie stored by the service requesting device's browser will now be described.

EXAMPLE 1

Simple User Confirmation of Observed Private IP Address

1) User requests browser in device to navigate to enabled web application
2) Web application makes HTTP JSON request for IP address of phone from DAS 22, no cookie supplied
3) DAS 22 reports new device and instructs web application to display confirmation dialog.
4) Web application prompts the user to confirm that the requesting device and the phone are connected to the same LAN and are visible to each other. If phone has reported multiple interfaces are connected then user may also be asked to select which network type e.g. Wifi, USB, Bluetooth they are connected on.
5) User confirms that the devices are on the same network
6) The web application instructs the server to set the stored device signature to the current observed LAN signature for that interface (the stored signature would therefore contain signatures of all devices currently seen on that LAN not just the requesting device)
7) DAS 22 returns the correct private IP address along with the new cookie in the response

EXAMPLE 2

User Manually Identifies Requesting Device

1) As above
2) As above
3) DAS 22 creates a dynamic web page containing list of devices (with human friendly names) on each network interface that the phone can currently see based on the observed device signatures
4) Web application displays the list of devices and asks the user to select the which device they are running the web application on.
5) User selects the device
6) Web application sends an identifier for the selected device to DAS 22 which extracts the corresponding observed device signature, allocates a new cookie and stores the device signature and cookie in DB 2.
7) DAS 22 returns the correct private IP address along with the new cookie in the response.

EXAMPLE 3

Router Supplied Information

If the DAS provider is also the router provider and there is the possibility of modifying the router software to enable the router to add information to HTTP requests to the DAS 22. In this embodiment, the router performs a similar function to that of the addressing client i.e. capturing broadcast packet information from devices on the network and storing the device specific information for later use. In this embodiment, the router will maintain a record of any UpnP UUIDs broadcast from a particular device and if an HTTP request is made to the DAS 22 the router modifies this request to add the UpnP UUID.

1) As above
2) As above
3) Router dynamically modifies HTTP address request to add previously captured broadcast packet information from this source IP address e.g. UpnP UUID, NBNS computer name as additional HTTP headers
4) DAS 22 extracts information from HTTP headers and creates a new stored device signature entry and associated cookie.
5) DAS 22 searches observed LAN signature database for the newly created stored device signature
6) DAS 22 returns the correct private IP address along with the new cookie in the response.

EXAMPLE 4

Stimulated Broadcast Packet

When some browsers and operating systems known in the art use the Windows™ NBNS (NetBIOS naming service) to resolve the IP address of a URL which contains a local domain name. In this embodiment, the same mechanism is used to force the requesting device to generate a broadcast packet.

If the local domain name is a random name, the DNS 22 correlates the stimulated packet with one or more observations reported by any mobile devices in order to determine which of the observed device signatures correspond to the requesting mobile device. This signature can then simply be copied to the stored device signature database.

1) As above
2) As above
3) DAS 22 creates a dynamic web page containing a random local URL e.g. http://randomcomputername/
4) Web application attempts to load the above dynamically generated local address, then re-requests the phone's IP address
5) Hosting device generates an NBNS query request for "randomcomputername"
6) Phone1 detects new multicast NBNS packet and notifies DAS 22 of new observed packet
7) DAS 22 correlates newly observed packet with stimulated packet request, creates new stored device signature and sets the cookie
8) DAS 22 returns the private IP address of the interface that reported the stimulated broadcast packet along with the new stored device signature cookie in the response to the web server.

General Use by Third Party Web Apps

In one embodiment of the invention, whenever a $3^{rd}$ party AJAX application on a fixed machine (for example, a permanently connected device) wishes to connect to a particular telecommunications enabled server, for example, a phone device, then it may or may not query a user for the phone number of the device to connect to (the preferred phone number may already have been stored in the web application's user preferences database). Once it has the phone number then the required address lookup request is generated.

The AJAX application then contacts the proprietary addressing server via HTTP to determine the latest private address for the mobile device. The addressing server extracts the cookie supplied in the request and pulls out the stored device signature associated with this browser and then searches to see if the mobile phone with the requested number has reported that it can see a device with a matching signature (i.e., matching the signature of the service requesting device) using the processes describe earlier. The phone should have reported previously if device is visible (and on which interface(s) if multiple interfaces are possible), and where many interfaces are available, the dynamic addressing server 22 selects an interface according to a preference policy, e.g. it may be configured to select a Bluetooth interface instead of a WIFI interface, which indicates a preferred IP address to contact the mobile device on.

In one embodiment, the addressing web-service HTTP interface is implemented as a XML based web services accessed though an XMLHttpRequest tag in the AJAX application or as a JSON format object accessed through dynamic loading of a <script> tag.

In one embodiment, access to the DAS web service requires a user of the mobile device which is seeking access to supply authentication information, for example, a username and/or password which associated with the identity of the requested mobile phone service. Since this request is a standard HTTP request it is clear that HTTPS could be used to ensure end to end encryption of the web service request for additional security.

Once a fixed device is securely connected and has accessed the web service it receives either a response indicating the mobile device is unavailable or a response which contains the private IP address of the mobile device. If the mobile device is reported as unavailable then the web application periodically polls the DAS 22 in order to be notified when the mobile device becomes available. Table 3 below shows an exemplary observed LAN presence signature database 24 data record structure:

| Mobile ID | Network I/F | | Observed Packet |
|---|---|---|---|
| Mobile 1 (07 . . . | I/F1 | IP = 192.168. MAC = 0x03e, SSID = home type = DHCP | Device1 sig = pkt1, type = NBNS, . . . Device2 sig = pkt1, |
| | I/F2 | IP = 169.154 . . . MAC = 0x0555 . . . | |
| Mobile 2 (07 . . . | I/F1 | IP = 192.168. MAC = 0x03e, SSID = work type = DHCP | Device 4 sig = pkt1, type = NBNS, . . . Device5 sig = pkt1, |

Table 4 below shows an exemplary stored device signature database 26 data record structure:

| DeviceID | Reference |
|---|---|
| Device 1 Cookie = abc1 | sig = pkt1, |
| Device 2 Cookie = abc1 | sig = pkt1, type = NBNS... |
| Device 3 Cookie = abc1 | sig = pkt1, |
| Device 4 Cookie = abc1 | sig = pkt1, type = SSDP... |

Figure 4A:
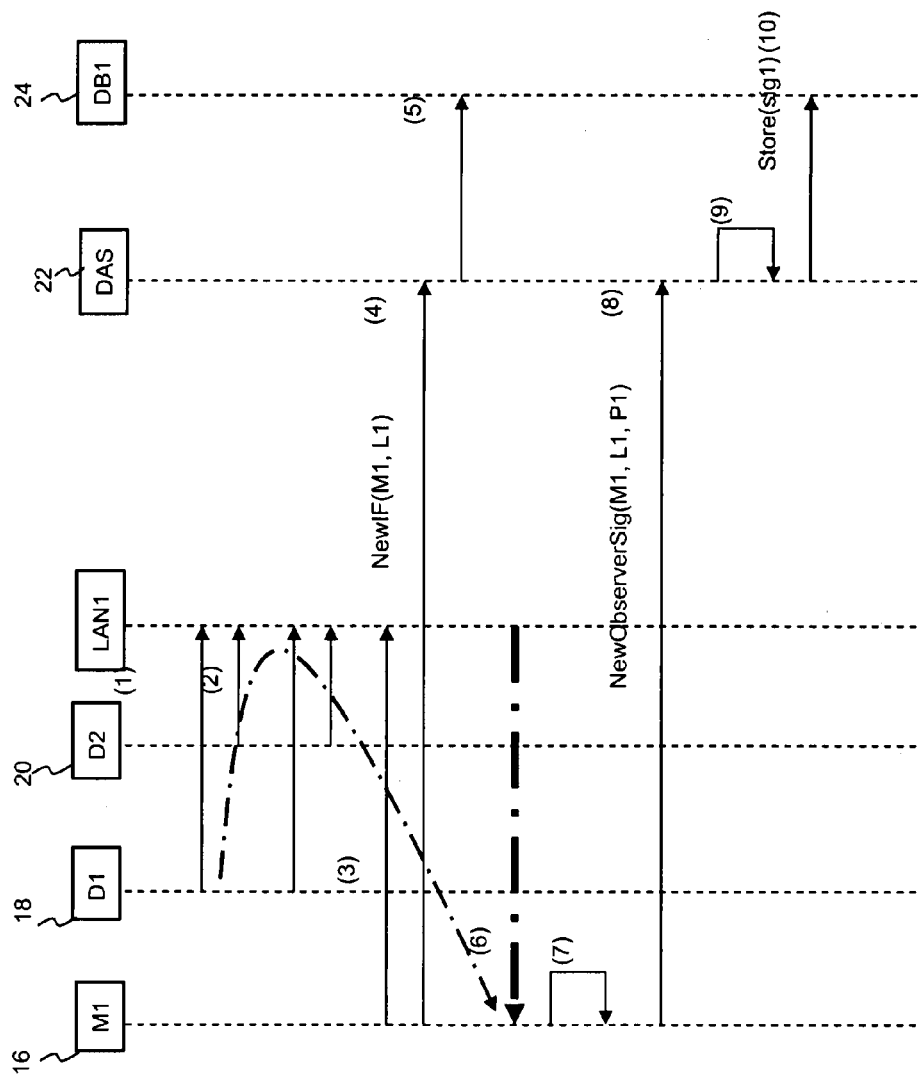
FIG. 4A shows preliminary steps in an address registration sequence diagram for an embodiment of the invention.

FIG. 4A of the accompanying drawings shows an exemplary address registration sequence diagram in which device D1 (18) is connected to LAN segment L1 (see the sequence arrow labelled (1) in FIG. 4) and device D2 (20) is also connected to LAN segment L1 (see the sequence arrow labelled (2) in FIG. 4). Devices D1 (18) and D2 (20) periodically issue multicast packets P1 . . . PN on the LAN L1.

Consider at some subsequent point mobile device M1 (16) which connects to LAN segment L1 (arrow (3). M1 (16) notifies the domain addressing serverdomain addressing server DAS 22 of its new interface connection to LAN segment L1 (arrow (4)). The notification informs the NAT traversal device, for example, router 14, on LAN segment L1 of the private IP address IP1 of M1 (16) and enables the DAS 22 to update the LAN segment L1 presence database DB1 with this information (arrow (5)).

Mobile device M1 then captures multicast packet P1 via its interface to LAN L1 (I/F L1). This multicast packet P2 originates from D1 (18) (see dash-dot thick arrows labelled 6).

From this packet, mobile device M1 determines that P1 is a new protocol type packet from device D1 (18) (arrow 7). A packet is now sent by M1 (18) to DAS (22) which associates an identifier for mobile device M1 (IDM1) with information identifying LAN L1 (L1 info) (arrow 8).

DAS 22 extracts the time independent fields of packet P1 (arrow 9) and creates new observed device signature SIG1 for device D1 on LAN L1 for mobile device M1 (arrow 10).

Figure 4B:
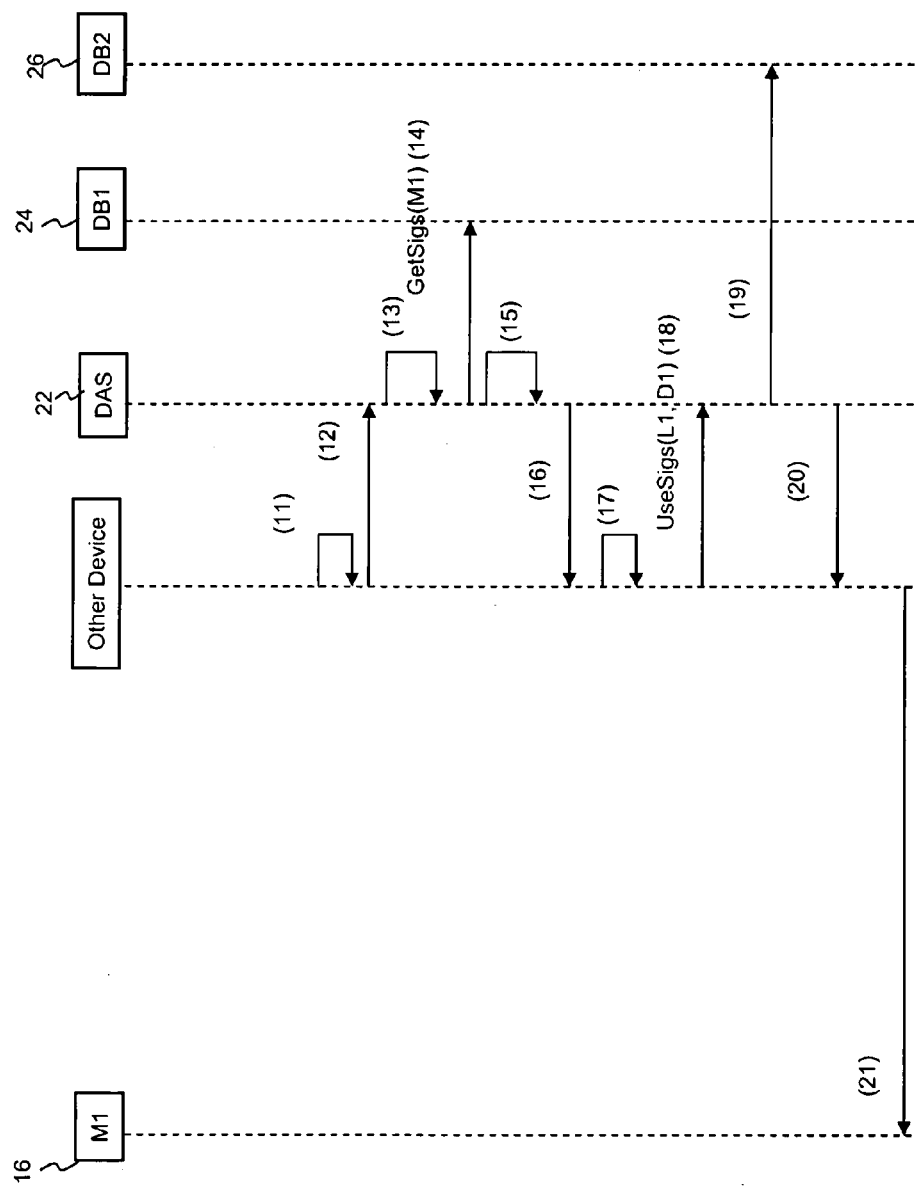
FIG. 4B shows the continuing steps from FIG. 4B.

In FIG. 4B, which continues from FIG. 4A, an exemplary embodiment is shown in which a mobile device M1 is capable of providing a web-service, i.e., acting as a server, to another device (which may or may not be a device connected to the same LAN L1 such as D1 or D2).

The other device on the LAN (which may or may not be D1 or D2) is shown as "Other Device" in FIGS. 4a,b and 5 now runs a web browser application, referred to below as a "WebApp" which loads the web application (arrow 11) with a http request for the address of mobile service providing device M1 which is sent to DAS 22 (arrow 12). In this case, DAS 22 does not find a cookie for M1 (arrow 13). As a result DAS 22 dynamically creates a web page containing the pairing user interface using observed sigs for M1 stored in DB1 (arrows. 14, 15, 16).

In the exemplary embodiment shown:

the WebApp runs a pairing interface (arrow 17);

the WebApp provides Signature Generation Information to the DAS 22, for example, information such as to use the identifier for LAN segment L1 or the device identifier for device D1 (18) (arrow 18);

the DAS 22 creates new device signature and associated cookie (arrow 19).

the DAS 222 then returns the private IP address of the mobile server M1 on LAN L1 and a new cookie (arrow 20) to the WebApp, which enables the WebApp to make a HTTP request to the mobile device M1 (arrow 21).

Figure 5:
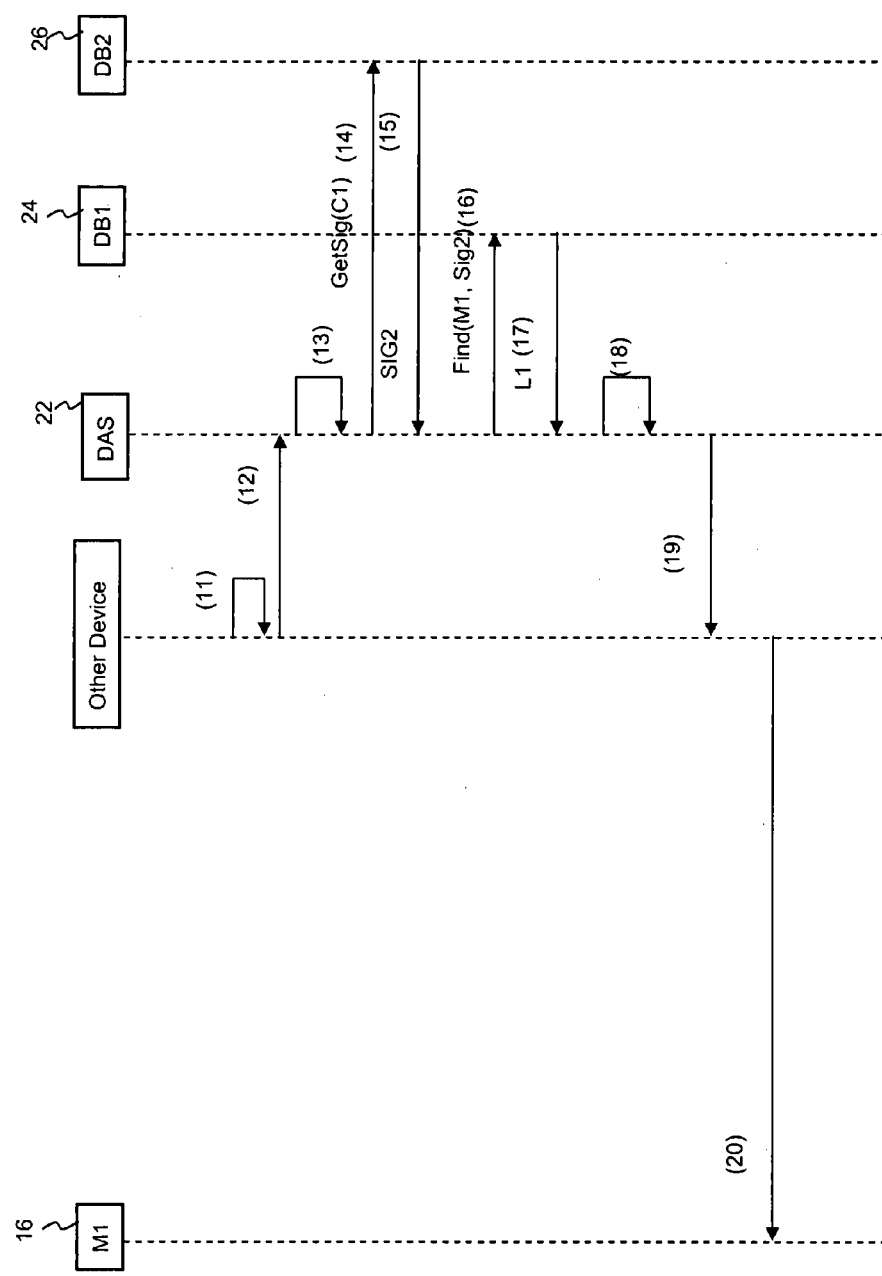
FIG. 5 continues the steps shown in FIG. 4A to show an address look-up sequence diagram for an embodiment of the invention.

FIG. 5 of the accompanying drawings, shows an address lookup sequence diagram for an exemplary embodiment of the invention, and the description below also refers to preliminary steps which are shown in FIG. 4A.

In this exemplary embodiment of an address lookup, devices D1 and D2 already connected to LAN L1 (see the arrows labelled (1) and (2) in FIG. 4A).

D1 and D2 periodically issue multicast packets P1 ... PN (unlabelled arrows in FIG. 4A).

Mobile device M1 connects to L1 (arrow (3)), the mobile device M1 notifies DA Server of new interface L1 together with its private IP address IP1 (arrow 4) and DB1 (presence data store 24) is updated (arrow 5). The mobile device M1 then captures a multicast packet P1 on its interface with LAN L1 (I/F L1) which originated from device D1 (thick dash-dot arrows labelled (6)). The mobile device M1 then determines packet P1 conforms to a new communications protocol type which it has not previously received from device D1 (arrow 7). This triggers the mobile device M1 to notify the DAS 22 by sending a packet to DAS 22 which associates an identifier for the mobile device ID M1 with LAN L1 (arrow 8). DAS 22 then extracts the time independent fields of packet P1 (arrow 9) and creates new observed device signature SIG1 for D1 on L1 for M1 (arrow 10). FIG. 5 shows another device connected to LAN L1, which may or may not be device D1 or D2, runs a web-browser application "WebApp" which loads a web application (arrow 11) using an http request for address of M1 which is sent to DAS 22 (arrow 12).

DAS 22 extracts browser ID cookie C1 from request (arrow 13).

The DAS 22 then looks up stored device signature SIG2 stored for cookie value C1 in the device signature data store 26 (DB2) (arrows 14, 15) and DAS 22 then searches the presence data store 24 (DB1) for match between SIG1 and SIG2 (arrow 16). If match found then presence data store DB1 returns interface details for L1 (arrow 17). The DAS 22 then extracts the M1 private IP address on LAN 1 (arrow 18) and returns the private IP address of M1 on LAN L1 to the requesting web-application (arrow 19). This enables the web-browser application to make an HTTP request to mobile communications device M1 (arrow 20).

Returning now to FIGS. 1, 2 and 3 of the accompanying drawings which show exemplary scenarios in which the invention is implemented.

FIG. 1 described herein above shows an exemplary embodiment in which a device 16, referred to hereinbelow as an addressing terminal 16, has a wireless (for example, WIFI) connection to a LAN L1 and has been provided with a private internet protocol IP address 192.168.0.22. The private IP address is used within the private IP address domain of the communications network 10 bounded by router 14. The private IP address is used for routing multicast and unicast packets to the device 16. The same or a different private address domain, also bounded by router 14, may be used for communicating with other devices (for example, device 18 which is capable of running a generic web-browser application) which are connected on the same WIFI/LAN segment with private IP address 192.168.0.20. For example, the private network route may be implemented using a universal serial bus (USB) type of connection or a Bluetooth connection, or other suitable connection in an embodiment of the invention in which the addressing device 16 comprises a mobile phone type device and the device #2 (18) comprises a personal computer which can also communicate over a separate 3G wireless LAN.

Also shown in FIG. 1 and connected to the same LAN segment via a wired connection is a device 20, referred to hereinbelow as an addressed device 20, with the private IP address 192.168.0.21. In this exemplary embodiment, the addressed device is the mobile device which updates the DAS 22. Local LAN connections are supported by a wireless enabled router 14 (which also can support wired connections) and which supports one or more private address domains, including a private IP address range within the LAN segment L1. Externally, the LAN public address is perceived to be of the form 193.113.x.y in the exemplary embodiment of the invention shown in FIG. 1. As such, the router 14 shown in FIG. 1 performs NAT and may also act as an access point for wireless connectivity with LAN segment L1.

Figure 2:
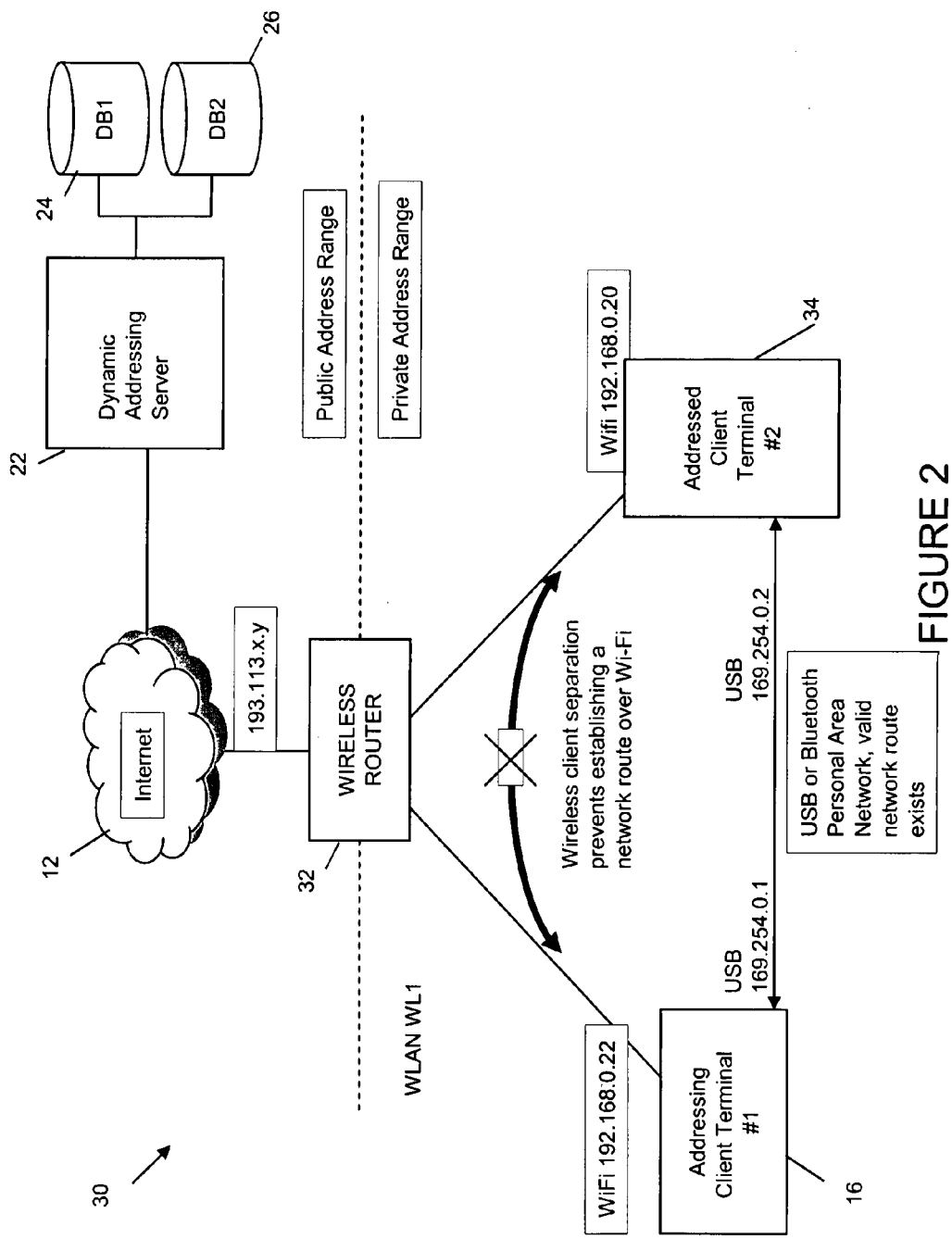
FIG. 2 shows a communications system comprising an addressing scheme according to a second embodiment of the invention.

FIG. 2 shows an alternative embodiment of the invention implemented a public wireless LAN (WLAN) environment. In FIG. 2, as with the other figures, like elements retain the numbering scheme of the previously described figures.

In FIG. 2, a wireless router 32 provides an access point for devices 16 and 34 on a wireless LAN to access the internet. Device 16 is shown in FIG. 1 as addressing device #1 and is able to communicate only an alternative communications protocol, here via a short-range communications protocol (for example, via a USB or Bluetooth connection) with the other device 34, shown as an addressed device #2 in FIG. 1, due to wireless client separation which prevents the two devices 16 and 34 from communicating directly with each other over the WIFI network.

In this embodiment of the invention, the addressing device 16 is able to register the presence and availability of services provided by the addressed client with the DAS 22 using the alternative peer-to-peer communications protocol, which enables other devices (not shown) connected to the LAN provided by wireless router 32 to be aware that these services are available from device 34 even though they would not be aware of this device via the LAN supported WIFI communications protocol due to the device separation it is imposing.

Figure 3:
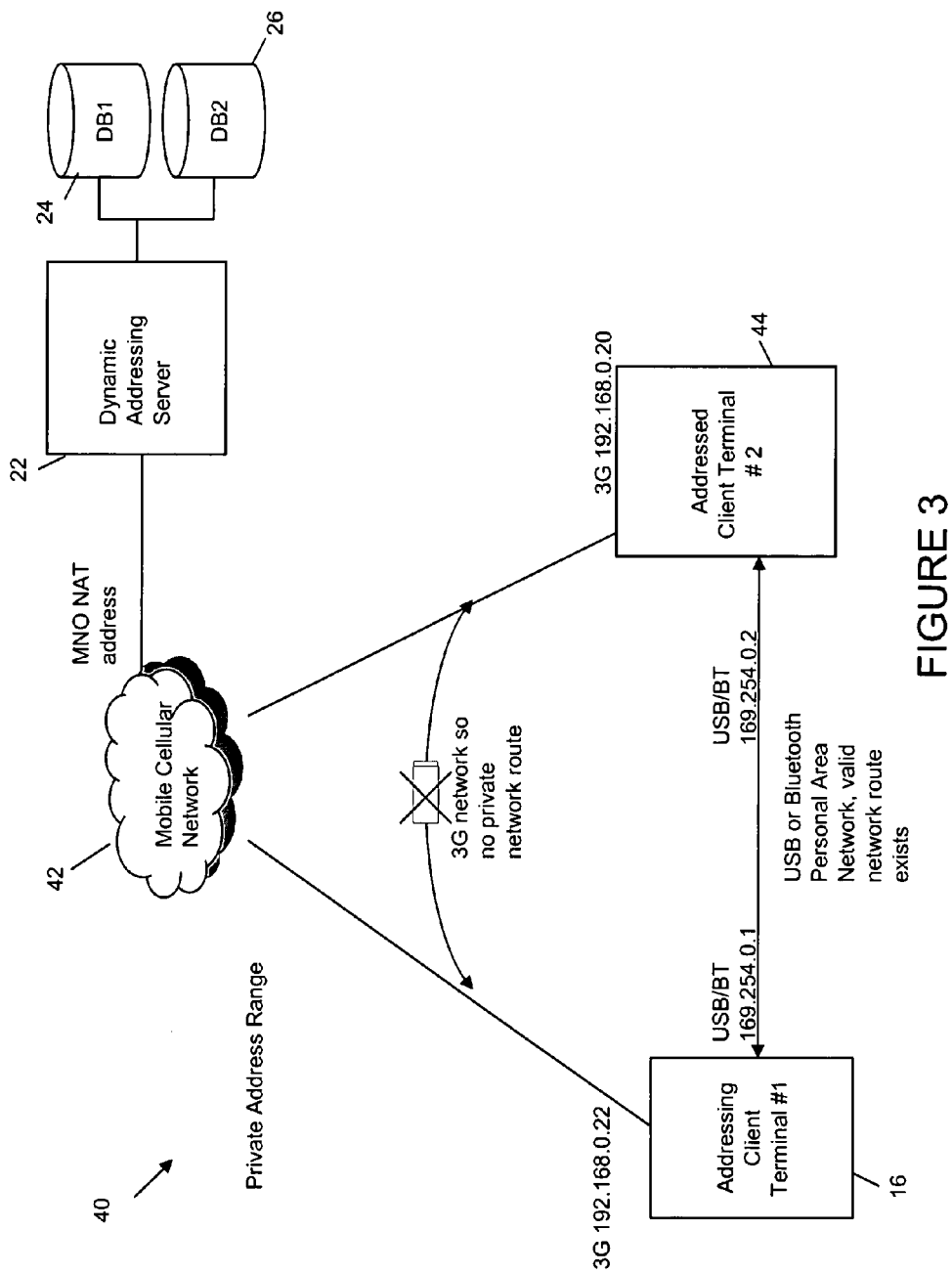
FIG. 3 shows a communications system comprising an addressing scheme according to a third embodiment of the invention.

Finally, FIG. 3 shows a variation of FIG. 2 in which the wireless communications protocol providing the main communication protocol between two devices connected to the same communications network is a wireless cellular communications protocol such as 3G. Here again the numbering scheme of the previous drawings is retained for like elements.

In the embodiment shown in FIG. 3, two devices 18, 44 are connected to a mobile cellular network 40 (shown in FIG. 3 as a 3G cellular network). They are also connected to each other via an alternative private network route, using a different communications protocol, for example, as shown in FIG. 3 via Bluetooth™ or via a USB connection. In this embodiment of the invention, the DAS 22 receives notifications from a mobile dynamic addressing device (for example, a mobile telecommunications enable device) 16 that it can see a packet say on a Bluetooth connection from device 44. In this case, the DAS determines that device 16 is presence on the same LAN segment as the addressed device which is running a web-browser application.

Thus, in some of the embodiments of the invention described herein above, a device (a term used herein synonymously with mobile device or device) which connects to a LAN is able to make its presence known to other devices already connected to the LAN by registering its presence with DAS 22. Devices on the LAN broadcast packets using a range of communications protocols, some of which differ from the communications protocol used by the LAN. When the device first sees these packets it reports them to the DAS 22 which enables the DAS 22 to update its signature and presence records as appropriate for the reported and reported devices.

In one embodiment of the invention, a service offering mobile device reports to the server a list of unique device identifiers that it can see on each of its interfaces. The server uses a unique id supplied by a service requesting device and matches this identifier against the dynamic list of identifiers which the service offering mobile device reported. The server 22 then confirms back to the service requesting device via which interfaces (and thus via which communications protocols) it is able to communicate (if at all) with the service offering mobile device and provides the appropriate IP address for that interface to the requesting device. It may also provide port and/or other information as appropriate.

The DAS 22 uses a cookie supplied by a web-browser application running on the service requesting device to determine the list of identifiers associated with the requesting device. If any of these identifiers for the requesting device have been previously reported by the service providing mobile communications device to the DAS 22, then a private network route exists between the two devices and the appropriate IP address is returned. This means that where two devices are not connectable using the same communications protocol on a particular network at a particular time, if at that time they are capable of forming a connection using a different type of communications protocol/network it is still possible for the two devices to communicate and for a web-browser to be automatically configured to use this alternative "private" route between the two devices.

Advantageously, the DNS information is thus updated when the CLI of an inbound call indicates the IP address is stable, which enables a mobile client to update the DNS information when a cellular or WIFI data connection becomes unavailable.

The invention does not rely on the form of the public IP address of the two devices 16, 20 to determine whether the devices are on the same LAN as the mapping between public address and LAN segment only works if there is a single layer of Network Address Traversal between the devices and the DAS 22 and it is common for there to be multiple layers of NAT in practice.

If two devices are connectable on the same LAN segment, the device requesting the connection can be provided with information by the domain addressing server as to which network communications protocol and interfaces should be used to send the connection request to the other device. In this way, for example, the invention enables, an address requesting device to provide a device-label (for example, a hostname or telephone number) for a device with which it would like to connect to an domain addressing server which is located externally to the LAN segment. The domain addressing server resolves the device-label to identifier a private address for that particular device which indicates the device is present in the same LAN segment and also, the availability of the device, for example, how it may be connected. By providing this information, i.e., which communications network protocol and/or interface should be used when the requesting device initiates contact with that device, it is possible for two device to automatically establish connectivity whilst maintaining their respective addresses private as regards other devices in the same private address domain and LAN segment.

Moreover, even when two devices share a public IP address, a working network route between their private IP addresses may not exist in practice. For example in public Wi-Fi Hotspots it is common for the access point to employ Wireless client separation in order to specifically prevent one device from being attacked by other devices on the same hotspot AP.

In addition many devices these days have multiple network interfaces and hence may simultaneously have multiple public and private IP addresses and yet there may only be one route between the devices via one network interface. For example take the case of a Wi-Fi laptop and Wi-Fi enabled phone. Both devices may be connected to a public Wi-fi hotspot AP and able to connect to the internet independently via their Wi-Fi connections. However they may also be connected on a separate LAN established via a USB cable or Bluetooth PAN network. In this case due to wireless client separation on the Wi-fi hotspot there is no route between the devices based on their Wifi private addresses however there is a route using their private addresses on the Bluetooth or USB network. In this situation the DAS 22 is able to correctly supply the private address of the Bluetooth or USB interface as the address for the mobile phone device.

Whilst two devices are typically in the same private address range in order to implement the invention, they need not necessarily be in the same private address range providing the private address is locally routable. Moreover, it is not sufficient for the requesting device to know the private address of the service provider, the requesting device needs to be able to connect to this address. Accordingly, the two devices may have different private address ranges provided they are on the same LAN segment, a term used herein to refer to the area within whose boundary two devices can be located and use ARP for each other and receive multicast traffic, for example, a LAN segment may be bounded by a one-hop router. However, the boundary need not be a physical boundary. A router may bridge two physical LAN segments e.g. in a WIFI-enabled router the fixed Ethernet and WIFI are bridged to form a single bridged LAN, in which case ARP and multicast traffic are routed across both segments. In this context, the devices may be connected on multiple interfaces simultaneously where only one of the interfaces is locally routable. For example, a laptop and a mobile may be both connected to a wide-area network (WAN) using a cellular communications link and to each other over Bluetooth PAN. The private addresses are from the Bluetooth link since though both devices will be in the same private cellular address range they are not routable using these private cellular addresses. The Bluetooth private address is sent/received from the addressing server via the cellular WAN. All service traffic is then routed over the Bluetooth LAN since this is the address for the service provider that is used.

A user-configurable, uniquely-specified, "label" may be used as a device-label instead of a label which conforms to a known addressing scheme provided this has been previously registered at the DAS 22 and uniquely resolves to a particular device.

Exemplary embodiments of the invention were described in detail herein above and pictorially in the accompanying drawings, however, the invention is not intended to be limited to exemplary embodiments but includes various obvious modifications and equivalent arrangements, which fall within the purview of the appended claims. Features referred to explicitly herein and in the claims may be replaced with alternative features providing functional equivalents where such functional equivalents would be known to those of ordinary skill in the art.

In the above description, references to "one embodiment," "an embodiment," "example embodiment," "various embodiments," etc., indicate that the embodiment(s) of the invention so described include a particular feature, structure, or characteristic. However, it is not necessary for every embodiment to comprise that particular feature, structure, or characteristic. Where the phrase "in one embodiment," or "in an exemplary embodiment," is referred to herein above it may or may not refer to the same embodiment as would be apparent to one of ordinary skill in the art.

Terms referring to features such as, for example, "processing," "computing," "calculating," "determining," or the like refer to an action and/or process(es) undertaken by a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "computing platform" comprises one or more data processors, where a data "processor" refers to any device or portion of a device that processes electronic data from registers and/or memory to transform that electronic data into other electronic data that is capable of being stored in registers and/or memory.

One or more embodiments of the invention include apparatuses for performing the operations herein. An apparatus may be specially constructed for the desired purposes, or it may comprise a general purpose device selectively activated or reconfigured by a program stored in the device.

One or more embodiments of the invention are implemented in one or a combination of hardware, firmware, and software.

One or more embodiments of the invention are implemented as instructions stored on a machine-readable medium, which may be read and executed by a computing platform to perform the operations described herein.

The term "machine-readable medium" comprises any mechanism for storing or transmitting information in a form readable by a machine (e.g., a computer). Examples of machine-readable mediums include, but are not limited to: read only memory (ROM), random access memory (RAM), magnetic disk storage media, optical storage media, flash memory devices, and propagated electrical, optical, acoustical or other suitable digital and/or analogue signals (for example, carrier waves, infrared signals, digital signals, etc).

References to the term "computer program" and/or "computer control logic" include as appropriate references to machine code and/or executable code and/or source code which when compiled results in execution on a computing platform of the computer program.

A computer program may be provided in an electronically downloadable format or in a format which is stored in the main memory and/or secondary memory of a computing platform and/or data storage means capable of being attached and removed from a computing platform. Where a computer program is stored in one or more data storage means it comprises a computer program product. Such computer programs, when executed, are arranged to enable the computer platform or system to perform the features of the present invention as discussed herein. In particular, the computer programs, when executed, are arranged to enable a processor to implement one or more steps in a method according to an embodiment of the invention. Accordingly, such computer programs may represent data controllers of the computer system.

Another embodiment of the invention comprises a computer program product comprising a computer readable medium having control logic (computer software) stored therein. The control logic, when executed by a processor causes the processor to perform the functions of an embodiment of the invention as described herein.

In another exemplary embodiment of the invention implemented using software, the software is stored in a computer program product and loaded into a computer system using said data storage means and/or a hard drive and/or via a network communications interface card. Software implementing control logic executed by a data processor causes the processor to perform the functions of an embodiment of the invention as described herein.

In one embodiment, the computer software runs as a standalone software application program running atop an operating system. Alternatively, it is integrated into an operating system of the computing platform.

In yet another embodiment, the invention is implemented primarily in hardware using for example, but not limited to, hardware components such as application specific integrated circuits (ASICs), field programmable gateways (FPGAs) or one or more state machines, etc. Implementation of the hardware state machine so as to perform the functions described herein will be apparent to persons skilled in the relevant art(s).

In another exemplary embodiment, the invention is implemented primarily in firmware. In yet another exemplary embodiment, the invention is implemented using a combination of any of, e.g., but not limited to, hardware, firmware, and software, etc.

The embodiments and examples discussed herein are non-limiting examples. The embodiments of the invention described in detail herein above form exemplary embodiments only and it will be apparent to those skilled in the art that changes and modifications may be made without departing from the spirit and scope of the invention, for example, in its broader aspects. The embodiments of the invention as defined in the claims are intended to cover all such changes and modifications as fall within the true spirit of the invention.

The invention claimed is:

1. A communications system including a public address domain and a local area network segment comprising at least one private network address domain, the respective private network address domain corresponding to a respective local area network, the communications system including:
   a memory;
   a processor;
   in said local area network segment:
   at least one addressing device intermittently connectable to at least one of the local area networks and when connected to the at least one local area network, having a private network address within the respective private network address domain;
   at least one service providing device for providing a service to one or more of said at least one addressing device, the at least one service providing device being intermittently connectable to at least one of the local area networks and when connected to the at least one local area network, having a private network address within the respective private network address domain;
at least one boundary device provided at the boundary of said local area network segment and said public network address domain and arranged to provide translation between a private network address and a public network address; and
in said public address domain: a first data store storing presence information for at least one service providing device comprising: an identifier for said at least one service providing device;
a current private network address assigned to the at least one service providing device within the at least one private network address domain; and device identifiers relating to other devices observed to be within the same private network address domain;
a second data store storing signature information for the at least one service addressing device comprising:
a cookie for identifying said at least one addressing device;
at least one associated device signature;
a network addressing server for providing addressing information of said at least one service providing device to said at least one addressing device, the network addressing server comprising:
a data store updater for updating the first data store with current presence information of the at least one service providing device and for updating the second data store with device signatures said at least one addressing device; wherein the device signatures comprises device specific and time independent identifier data which are broadcast by the addressing devices onto the at least one private network address domain;
a receiver for receiving a request from the at least one addressing device regarding whether the at least one service providing device is accessible to the at least one addressing device via a common private network address domain, the request containing: the identifier for the at least one service addressed device; and the cookie for the at least one addressing device; and
a search processor for processing the request by: searching the second data store using the cookie to retrieve the at least one associated device signature for the addressing device;
searching the first data store for correspondence between the retrieved at least one device signature and any device identifiers observed by the service providing device; and
determining that the addressing device and addressed device are present within a common private network domain if there is correspondence; and
a sender for returning the private network address of the service providing device to the addressing device.

2. The system as claimed in claim 1, wherein a private network address is a private internet protocol address.

3. The system as claimed in claim 1, wherein the identifier for said at least one service providing device comprises an E.164 number associable with the service providing device.

4. The system as claimed in claim 1, wherein the device signatures comprise a media access control address.

5. A method of operating a communications system to enable an addressing device to communicate with a web service providing device located in a common private network address domain, the communication system including a public address domain and a local area network segment comprising at least one private network address domain, the respective each private network address domain corresponding to a respective local area network, the communications system including:
in said local area network segment:
at least one addressing device intermittently connectable to at least one of the local area networks and when connected to the at least one local area network, having a private network address within the respective private network address domain;
at least one service providing device for providing a service to one or more of said at least one addressing device, the at least one service providing device being intermittently connectable to at least one of the local area networks and when connected to the at least one local area network, having a private network address within the respective private network address domain;
at least one boundary device provided at the boundary of said local area network segment and said public network address domain and arranged to provide translation between a private network address and a public network address; and
in said public address domain: a first data store storing presence information for at least one service providing device comprising: an identifier for said at least one service providing device;
a current private network address assigned to the at least one service providing device within the at least one private network address domain; and device identifiers relating to other devices observed to be within the same private network address domain;
a second data store storing signature information for the at least one service addressing device comprising:
a cookie for identifying said at least one addressing device;
at least one associated device signature; and
a network addressing server for providing addressing information of said at least one service providing device to said at least one addressing device,
the method comprising the network addressing server:
updating the first data store with current presence information of the at least one service providing device and updating the second data store with device signatures said at least one addressing device; wherein the device signatures comprises device specific and time independent identifier data which are broadcast by the addressing devices onto the at least one private network address domain;
receiving a request from the at least one addressing device regarding whether the at least one service providing device is accessible to the at least one addressing device via a common private network address domain, the request containing: the identifier for the at least one service addressed device; and the cookie for the at least one addressing device; and
searching the second data store using the cookie to retrieve the at least one associated device signature for the addressing device;
searching the first data store for correspondence between the retrieved at least one device signature and any device identifiers observed by the service providing device; and
if there is correspondence, determining that the addressing device and addressed device are present within a common private network domain; and
sending the private network address of the service providing device to the addressing device.

6. The method as claimed in claim 5, wherein a private network address is a private internet protocol address.

7. The method as claimed in claim 5, wherein the identifier for said at least one service providing device comprises an E.164 number associable with the service providing device.

8. The method as claimed in claim 5, wherein the device signatures further comprise a media access control address.

\* \* \* \* \*